United States Patent [19]

Penzias

[11] Patent Number: 5,397,133
[45] Date of Patent: Mar. 14, 1995

[54] SYSTEM FOR PLAYING CARD GAMES REMOTELY

[75] Inventor: Arno A. Penzias, Highland Park, N.J.

[73] Assignee: AT&T Corp., Murray Hill, N.J.

[21] Appl. No.: 129,564

[22] Filed: Sep. 30, 1993

[51] Int. Cl.⁶ ............................ A63F 9/24; A63F 1/14
[52] U.S. Cl. ................................ 273/439; 273/148 R; 273/149 P
[58] Field of Search ............ 273/148 R, 149 R, 149 P, 273/85 CP, 439, 438; 434/128, 129

[56] References Cited

U.S. PATENT DOCUMENTS

| | | | |
|---|---|---|---|
| 4,373,719 | 2/1983 | Nelson et al. | 273/85 CP |
| 4,659,082 | 4/1987 | Greenberg | 273/149 R |
| 4,667,959 | 5/1987 | Pfeiffer et al. | 273/149 R |

*Primary Examiner*—Jessica J. Harrison
*Attorney, Agent, or Firm*—Barry H. Freedman

[57] ABSTRACT

A system for playing card games remotely includes both a multimedia communication system that allows players located remotely from each other to see and hear each other, and a "card toaster" and associated image recognition system at each game site which receives and manages a physical deck of cards at every site at which the game is being played. The toaster has the capability of (1) reading cards, for example, by scanning them, (2) finding particular cards, and, if necessary, sorting them, and (3) distributing cards, such as by dealing them. The system enables the players to deal and then play a game, such as the game of bridge, in a manner which closely approximates the manner in which a game is played when all players are co-located. Thus, once play is started, the image recognition system reads the cards played on a table at any site, and transmits information regarding those cards to the other sites. At the other sites, the card toaster is signaled and arranged to distribute the same cards, face up on the table.

15 Claims, 4 Drawing Sheets

SYSTEM FOR PLAYING CARD GAMES REMOTELY

FIELD OF THE INVENTION

This invention relates generally to the playing of card games by several persons not situated at the same physical location, and, in particular, to a system in which real playing cards are automatically managed at all sites at which the card game is played.

BACKGROUND OF THE INVENTION

While various real games have been modeled electronically, the electronic versions suffer the disadvantage that they lose the important physical characteristics that players are used to. For example, a person playing an electronic version of monopoly cannot move the game pieces around the board, receive and pay out money, roll the dice, or pick up and discard property deeds. Electronic card games do not let the players hold the hand that they are playing. Such electronic games can be played by players at remote sites, through the use of the telecommunications network, but the quality of the game playing experience is lessened by the inability to interact with real physical objects associated with the game.

Various multimedia or telepresence systems, have been developed to let persons at remote locations communicate and interact in a realistic way. They can speak with each other, see each other, send handwriting in two directions, or share programs with each other. The people at each location can each have the same physical game apparatus available at their location, and attempt to physically manipulate the game objects as the game progresses, as they would if they were in the same location. However, such an arrangement precludes secret distribution (dealing) of cards, without the intervention of a third (neutral) party. Also, input to such systems is typically limited to actions with either a keyboard or a "mouse", so that such systems do not solve the problem of lack of physical connection to the game.

Certain other systems have been developed to play chess.

SUMMARY OF THE INVENTION

In accordance with the present invention, a system for playing card games remotely includes both a multimedia communication system that allows players located remotely from each other to see and hear each other, and a "card toaster" and associated image recognition system at each game site which receives and manages a physical deck of cards at every site at which the game is being played. The toaster has the capability of (1) reading cards, for example, by scanning them, (2) finding particular cards, and, if necessary, sorting them, and (3) distributing cards, such as by dealing them.

A game is divided into two segments, dealing and playing. In the dealing segment, a deck of cards is shuffled and manually dealt or distributed at a first (local) site, such that each player at that site receives his or her physical cards, and such that hands for the other players in the game who are not present at that local site are dealt "face down". At the second (remote) site, the entire deck is placed in the toaster, face down. Upon completion of dealing at the first site, the hands dealt for the players at the remote site are placed in and "read" by the toaster. Signals are sent to the remote toaster, which, in turn, finds the corresponding cards, and distributes them, face down, to the remote players.

Once play is started, the image recognition system reads the cards played on a table at any site, and transmits information regarding those cards to the other sites. At the other sites, the card toaster is signaled and arranged to distribute the same cards, face up on the table.

If the game being played is bridge, then a special sequence is used with respect to the dummy hand. In particular, the dummy hand dealt at any site is placed, face up, in the toaster, and the cards are read and returned at that site. Signals are sent to the toasters at all remote sites, to find the corresponding cards and distribute them face up.

BRIEF DESCRIPTION OF THE DRAWING

The invention will be fully appreciated by consideration of the following detailed description, which should be read in light of the accompanying drawing in which.

DETAILED DESCRIPTION

Figure 1:
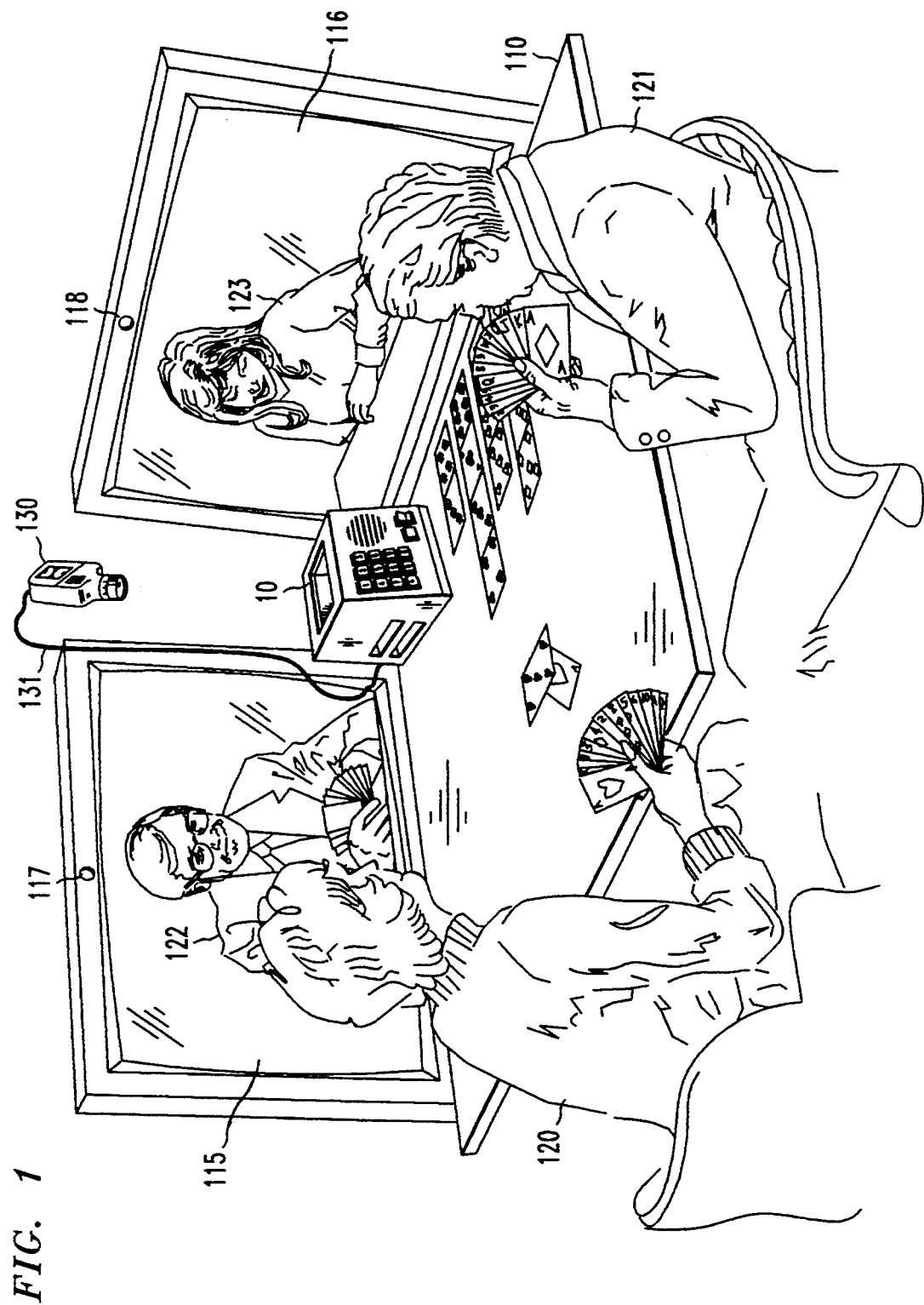
FIG. 1 is an overall illustration of a system for playing card games remotely arranged in accordance with the present invention, showing four players at two different sites playing the game of bridge.

Referring first to FIG. 1, there is shown an overall illustration of a system for playing card games remotely arranged in accordance with the present invention. Four players, 120-123 are shown, two of which, namely players 120 and 121, are at a first or local site, shown in FIG. 1, and the other two of which, namely players 122 and 123, are at a remote site. The system includes a multimedia communication capability, so that players at each site can be seen and heard by players at other sites. In the embodiment of FIG. 1, video images of players 122 and 123 are displayed on video screens 115 and 116, respectively, while audio from the remote site may be sent to a card toaster 10, described in more detail below, and output via a speaker contained therein. Cameras 117 and 118 may be disposed integral with video screens 115 and 116, and capture the images of players 120 and 121, so that those images may be transmitted to the remote site and displayed to players 122 and 123. Likewise, card toaster 10 may include a microphone for receiving audio from players 120 and 121 at the local site, so that audio information may be output via a speaker at the remote site.

The arrangement of FIG. 1 is intended to be illustrative of multimedia communication arrangements, and it is to be understood that other comparable configurations may also be used. In particular, one screen can be used to illustrate multiple players at a remote site. The screen size and configuration is not limited, and any video display method can be employed. Audio information can be conveyed by pairs of speakers, in monaural or stereo sound, and the speakers need not be integral with card toaster 10. Likewise, cameras 117 and 118 need not be integral with video screens 115 and 116, and a single camera may capture the images of all players at a particular site.

The card playing functionality of the present system is implemented using card toaster 10 in combination with an image recognition system, such as a camera 130, which can read cards disposed on the playing surface 110 being used by the players. As described in more detail below, card toaster 10 is arranged to distribute, receive and manage a physical deck of cards at every site that the game is being played. Card toaster 10 has the capability of (1) reading cards, for example, by scanning them, (2) finding particular cards, and, if necessary, sorting them, and (3) distributing cards, such as by dealing them. Note here that camera 130 may be a conventional video camera, or any other device having the capability of providing a signal which can be processed to identify and differentiate particular cards that have been placed on playing surface 110.

Figure 2:
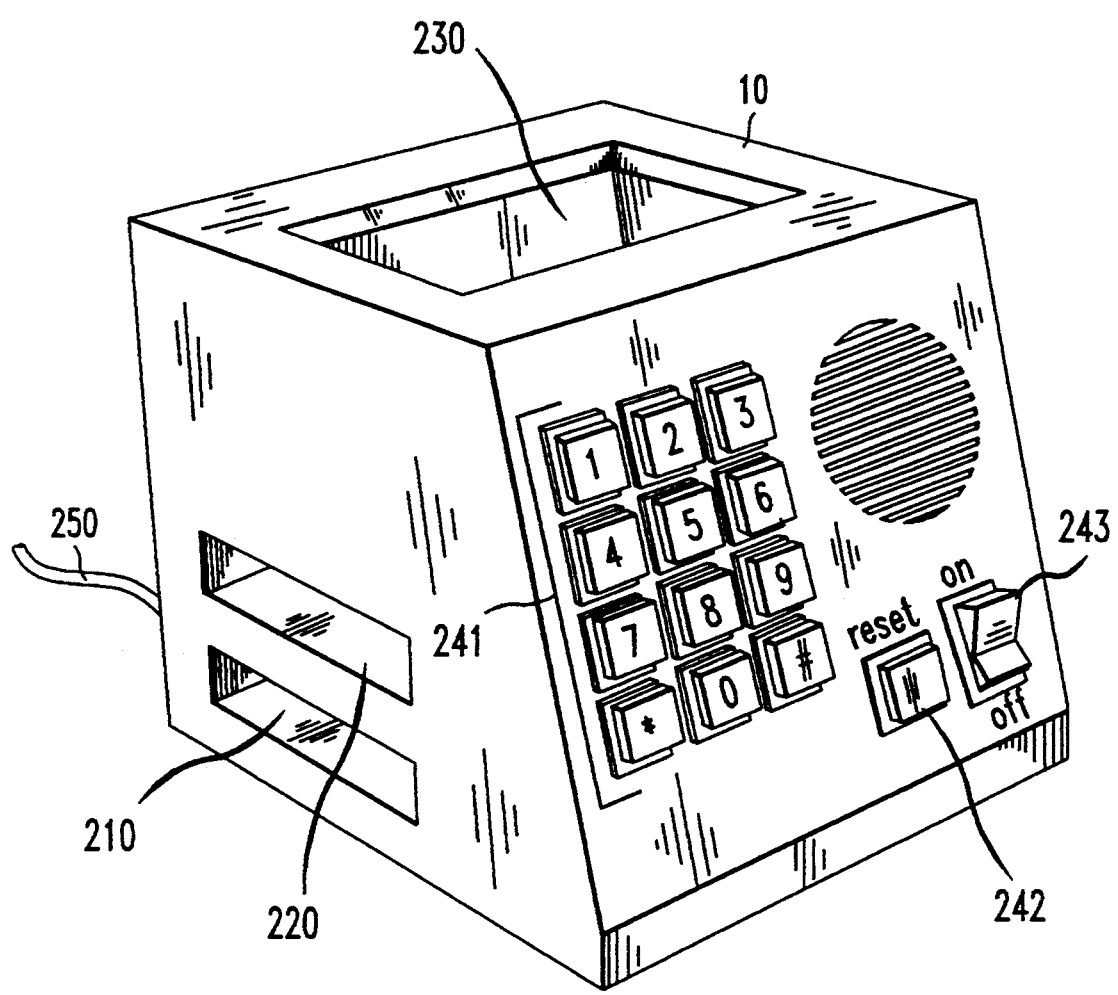
FIG. 2 illustrates in more detail the appearance and functionality of card toaster 10 of FIG. 1.

Referring now to FIG. 2, there is shown in more detail the appearance and functionality of card toaster 10 of FIG. 1. Card toaster provides card handling functionality of reading, finding and distributing cards, based on inputs received on communication line 250 from the remote site, information from camera 130, and in response to the placement of cards in card deposit slot 230. Card toaster 10 also generates signals and commands, and transmits the signals to the card toaster at the remote site, also via communication line 250.

More specifically, card toaster 10 includes a card deposit slot 230 into which can be placed one or more cards, either face up or face down. As described below, card toaster 10 includes a card reader controller which reads the cards placed in card deposit slot 230 and can differentiate their value (suit and rank) and their orientation (face up or face down). 10 distributes cards via first and second slots 210 and 220, one slot (e.g., slot 210) being for distribution of cards face up, and the other slot (e.g., slot 220) being for distribution of cards face down.

A control panel on card toaster 10 includes an on-off switch 243, a reset button 242, and may include a telephone call dialing or initiation mechanism, such as a keypad 241. On-off switch 243 controls the main power to card toaster 10, and reset button 242 clears internal logic in card toaster 10, so that, for example, a new game may be started. Many optional features may be added to card toaster 10 by persons skilled in the art, such as a display indicating system status, etc.

Figure 3:
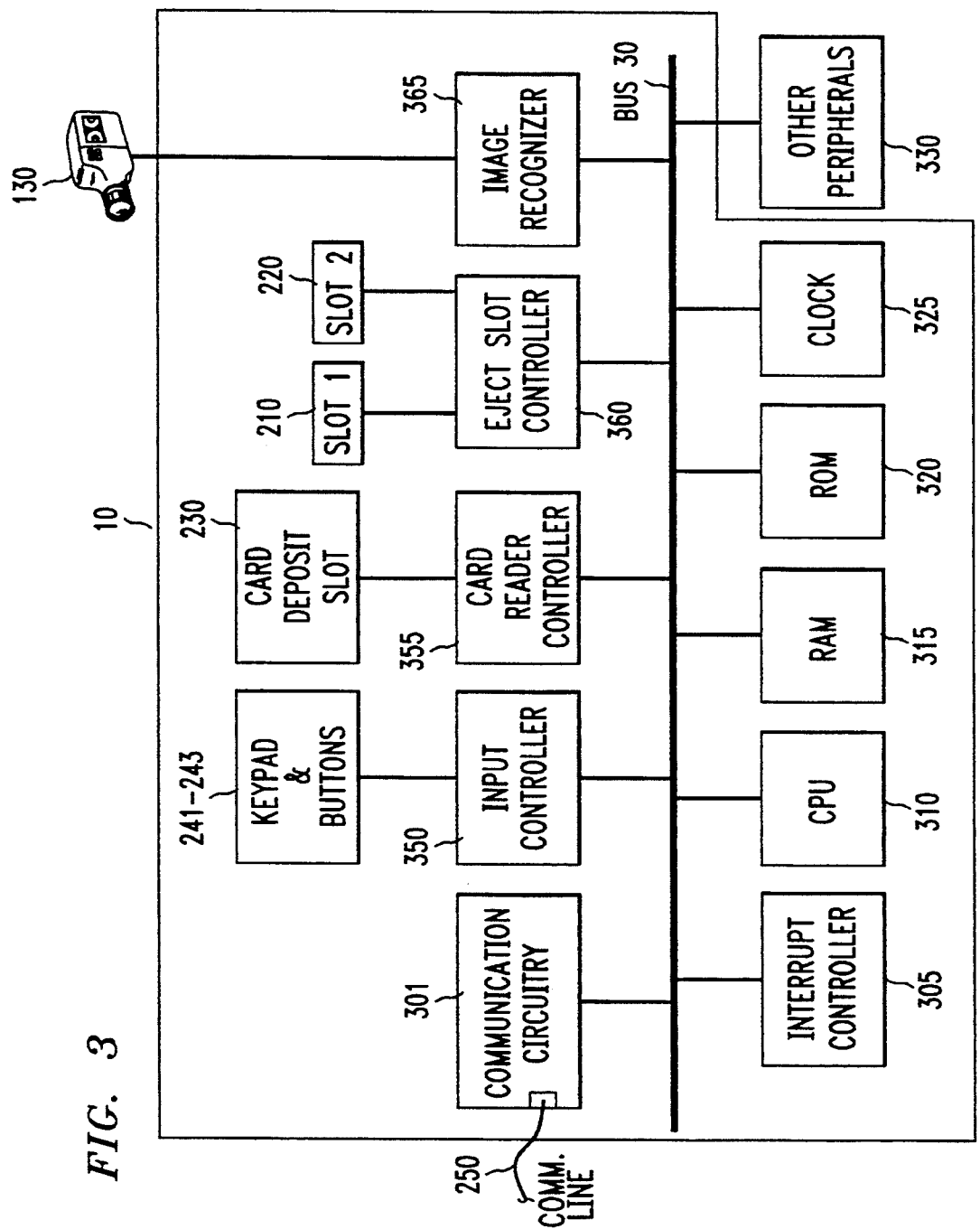
FIG. 3 illustrates the internal architecture and components of the system of the present invention.

Referring now to FIG. 3, there is shown the internal architecture and components of the system of the present invention. A central bus 30 interconnects various functional modules which interact cooperatively to perform the functions of card toaster 10. Specifically, card deposit slot 230 is connected to a card reader controller 355 which is in turn connected to central bus 30, so that the system can determine the value and orientation of each card placed in card deposit slot 230. Slots 210 and 220 are both connected to an eject slot controller 360, which is in turn connected to central bus 30 and which receives signals indicating which cards should be distributed from either slot. Camera 130 provides signals to an image recognizer 365 which is also, in turn, connected to central bus 30, and which sends signals indicating which cards have been placed on playing surface 110. An input controller 350 receives signals generated by keypad 241, reset button 242 and on-off switch 243, and couples appropriate signals indicative of commands and instructions to central bus 30.

A group of components shown in FIG. 3 controls the overall operation of card toaster 10, and essentially performs functions characteristic of a microprocessor. Specifically, a central processing unit (CPU) 3 10 is arranged to execute program instructions, which may be stored in the form of microcode in a read only memory (ROM) 320. The sequence of operations provided by the microcode when the system is used to play bridge, is discussed below in conjunction with FIG. 4. A random access memory (RAM) 3 15 is provided for temporary storage of state and other operation information, and a clock 325 provides suitable timing signals necessary for system operation. Interrupt controller 305 is arranged to handle interrupt signals that may be placed on central bus 30 by other system components.

Communication circuitry 301 acts as an interface between central bus 30 and communication line 250. It provides signaling to the remote card toaster(s) as well as communications signals which may be used to establish and control connections to remote sites.

Other peripherals, designated generally as 330, may be connected to central bus 30. These peripherals may perform additional functions and features such as printing summaries of games played using the system, or provide for input/output capabilities and enhancements, such as voice recognition and control.

Figure 4:
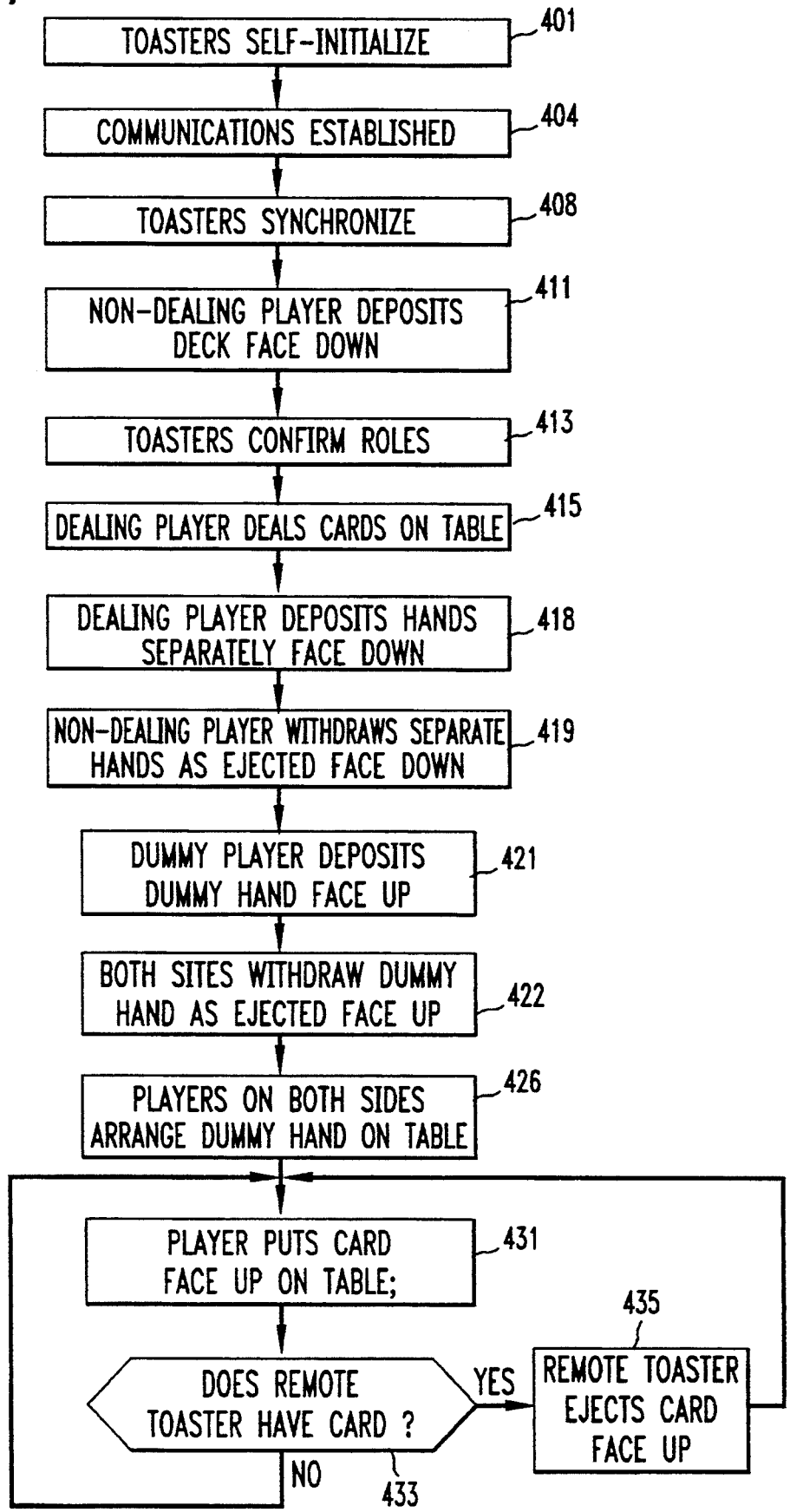
FIG. 4 is a flow chart illustrating the operation of the present invention, when the game of bridge is being played.

Referring now to FIG. 4, there is shown a flow chart illustrating the operation of the present invention, when the game of bridge is being played. In step 401, card toaster 10 and the remote toaster to which card toaster 10 will become connected, are each individually initialized, such as by actuating on-off switch 243. Next, in step 404, communications are established between the two sites, so that card toaster 10 and the toaster at the remote site are interconnected, and can transmit and receive control signals from and to each other. At this time, the multimedia communication connection between players 120 and 121, on the one hand, and players 122 and 123, on the other hand, may be established, if such a connection is not already established. The two toasters are synchronized in step 408, so that a game can commence. Synchronization includes determination of the configuration of the game, such as the number of sites that are participating.

The players determine the identification of the dealer, and the cards at the non-dealing site are placed face down into the toaster at that site, in step 411. The toasters confirm their roles in step 413, such that a signal is sent by the toaster receiving cards in card deposit slot 230 to the other toaster, indicating that the game may commence. The game of bridge is actually begun in step 415, when the dealer deals cards for all players, face down, on the table. The hands for the players at the remote site are placed, face down, into card deposit slot 230, and card toaster 10 reads the value and orientation of the cards and transmits this information to the toaster at the remote site. There, the toaster finds cards of the same value, and ejects them, face down, from slots 210 or 220, so that the non dealing player can withdraw them in step 419. Note here that the hands for each player are deposited in card deposit slot 230 separately, so that, at the remote site, the same hands are ejected separately, and may be physically given to the appropriate players.

At this point in the game, all players are holding cards that together comprise one complete deck. The players at the remote site each are holding cards with the same values as the cards that were dealt to them at the dealing site. Now, as part of the game of bridge, the players examine their cards and commence bidding, so that a contract is made and a "dummy" is identified. Next, in step 421, the dummy player deposits the dummy hand, face up, in card deposit slot 230. The toaster that receives the cards reads the value and orientation of the cards and transmits this information to other toaster. The master at both locations are arranged to eject cards of the same value from slots 210 or 220, face up, in step 422. In step 426, the players arrange the dummy hands on playing surface 110, in the customary manner.

When play commences, a player puts a card on playing surface 110, face up, in step 431. The value of the card that was played in read by camera 130, recognized by image recognizer 365, and communicated to the other toaster. If the remote toaster finds a card of the corresponding value, (i.e., a card played from a player's hand and not from the dummy hand), a positive result occurs in test step 433, and, as a result, the same card is ejected, face up, from the slots 210 or 220 of the remote toaster in step 435. If the remote toaster does not find a card of the corresponding value, (i.e., a card played from the dummy hand), a negative result occurs in test step 433, and, as a result, the no card is ejected; rather, the player at the remote site will play the same card from the dummy hand, as is customary in the game of bridge.

Various modifications and adaptations may be made to the present invention by persons skilled in the art. Accordingly, the invention should only be limited by the following claims. For example, while card reader controller 355 and image recognizer 365 may normally be arranged to identify and differentiate cards in a conventional deck, in an alternative arrangement, conventional cards could be modified to include a bar code or other special information which is easily detected and discriminated in the scanning process.

I claim:

1. A system for playing card games remotely including
    a multimedia communication system including audio and video communications means and arranged so that players at a plurality of game sites can see and hear each other, and
    a card handling apparatus and an associated image recognition apparatus at each game site for receiving and managing a physical deck of cards at each of said game sites,
    wherein said card handling apparatus includes means arranged to read cards, means to find particular cards, and means to distribute cards.

2. A method for playing card games remotely, including the steps of
    shuffling and manually dealing cards at a local site, such that each player at said local site receives physical cards, and such that cards for other players who are not present at said local site are dealt "face down";
    upon completion of dealing at said local site, placing the cards dealt at said local site and intended for the players at said remote site in a first card handler, at said local site, said first card handler arranged to manage a physical deck of cards and including means for reading cards, finding particular cards, and distributing cards;
    at a remote site, placing an entire deck of cards face down in a second card handler whereby said cards are read by said second card handler;
    transmitting signals from said first card handler to said second card handler, and
    responsive to receipt of said signals in said second card handler, finding the corresponding cards, and distributing said cards, face down, to said other players.

3. The method defined in claim 2 further including the steps of
    reading the cards played on a table at any site, with an image recognition system;
    transmitting information regarding those cards to the other sites;
    at the other sites, signaling a card handler at said site to distribute the same cards as those read, face up on the table.

4. The method defined in claim 3 further including the steps of
    placing a dummy hand of a game of bridge in one of said card handlers, face up;
    reading said cards in said one of said card handlers;
    returning said cards from said one of said card handlers;
    sending signals to said card handlers at all remote sites, indicative of said dummy hand; and
    in said card handlers at remote sites, finding the corresponding cards and distributing each face up.

5. Apparatus for playing cards games by players located at individual sites, said apparatus comprising
    a multimedia communication system arranged so that players at each site can be seen and heard by players at other sites;
    means including an image recognition system arranged to read cards disposed on each playing surface being used by the players; and
    a card handling system arranged to distribute, receive and manage a physical deck of cards at every site that the game is being played.

6. The apparatus defined in claim 5 wherein said card handling system includes
    means for reading cards by scanning them,
    means for finding particular cards, and
    means for distributing cards by dealing them.

7. The apparatus defined in claim 5 wherein said image recognition system includes a camera and means arranged to differentiate particular cards that have been placed on said playing surface.

8. The apparatus defined in claim 5 wherein said card handling system further includes
    a card deposit slot arranged to receive one or more cards, either face up or face down,
    a card reader controller arranged to read the cards received by said card deposit slot and to differentiate the value (suit and rank) and the orientation (face up or face down) of said cards; and
    means responsive to said card reader controller for distributing cards face up or face down.

9. The apparatus defined in claim 8 wherein said card handling system includes
    a control panel having an on-off switch, a reset button and a telephone call initiation mechanism.

10. The apparatus defined in claim 8 wherein said card handling system includes a microprocessor for controlling the overall operation of said card handling system and communication circuitry for acting as an interface between said card handling system and for providing signaling to similar card handling systems located at remote locations.

11. A method of playing card games wherein players at a local site complete with players at least one remote site, said method comprising the steps of
   establishing video and audio communications between said local site and said remote site,
   interconnecting card handling and management apparatus at said local site and said remote site, said apparatus including means for reading cards by scanning them, finding particular cards, and distributing cards face up or face down; and
   sending signals between said card handling and management apparatus so that actions at one site are duplicated at the other site.

12. The method of claim 11 wherein said method further includes the steps of:
   inserting cards into said card handling and management apparatus at one site and, responsive thereto, distributing cards from said card handling and management apparatus at said other site.

13. The method of claim 11 wherein said method further includes the steps of
   sensing cards placed on the playing surface at said one site; and, responsive thereto, finding cards of the same value and distributing said cards from said card handling and management apparatus at said other site.

14. The method of claim 11 wherein said method further includes sensing the orientation of said cards by determining if said cards are placed in said apparatus face up or face down, and responding with different actions based upon the orientation of said cards.

15. The method of claim 11 wherein said method further includes reading the value of a card played;
   recognizing the orientation of said card; and
   communicating said value and orientation to a remote site.

* * * * *